(12) United States Patent
Philipp (10) Patent No.: US 8,916,219 B2
(45) Date of Patent: Dec. 23, 2014

(54) METHOD AND APPARATUS FOR THE ENERGY-SAVING PRODUCTION OF CONFECTIONERY MASSES

(75) Inventor: Sieghart Philipp, Taulignan (FR)

(73) Assignee: CHOCOTECH GmbH (DE)

( * ) Notice: Subject to any disclaimer, the term of this patent is extended or adjusted under 35 U.S.C. 154(b) by 228 days.

(21) Appl. No.: 13/231,161

(22) Filed: Sep. 13, 2011

(65) Prior Publication Data

US 2012/0064203 A1    Mar. 15, 2012

(30) Foreign Application Priority Data

Sep. 14, 2010  (DE) .......................... 10 2010 037 516

(51) Int. Cl.
| | | |
|---|---|---|
| A23G 3/04 | (2006.01) | |
| A23G 3/34 | (2006.01) | |
| B01F 15/00 | (2006.01) | |
| B01F 15/04 | (2006.01) | |
| B01F 3/12 | (2006.01) | |
| A23G 3/02 | (2006.01) | |

(52) U.S. Cl.
CPC ........ *A23G 3/0008* (2013.01); *B01F 15/00428* (2013.01); *B01F 15/00194* (2013.01); *B01F 15/0445* (2013.01); *B01F 3/12* (2013.01); *A23G 3/001* (2013.01); *A23G 3/0044* (2013.01); *A23G 3/04* (2013.01); *A23G 3/021* (2013.01); *A23G 3/0226* (2013.01)
USPC ........... 426/231; 426/660; 426/519; 426/520; 366/141

(58) Field of Classification Search
CPC ...... B01F 15/0445; B01F 15/045; B01F 3/12; B01F 3/1207; B01F 3/1214; B01F 15/00194; B01F 15/00428; A23G 3/0008; A23G 3/001; A23G 3/021; A23G 3/0215

USPC .................. 426/231, 660, 519, 520; 366/141
See application file for complete search history.

(56) References Cited

U.S. PATENT DOCUMENTS

| 2,353,784 | A | * | 7/1944 | Reich ............................ 426/520 |
| 3,983,862 | A | * | 10/1976 | Spriet ............................. 127/58 |
| 4,362,219 | A | * | 12/1982 | Carlsson ....................... 177/245 |
| 4,660,990 | A | * | 4/1987 | Svensson ...................... 366/348 |
| 4,790,665 | A | * | 12/1988 | Hayashi ......................... 366/98 |
| 5,174,403 | A | * | 12/1992 | Geiger .......................... 177/245 |
| 5,223,303 | A | * | 6/1993 | Taskinen ...................... 426/660 |

(Continued)

FOREIGN PATENT DOCUMENTS

| AT | 193238 | 11/1957 |
| DE | 906886 | 3/1954 |

(Continued)

*Primary Examiner* — Drew Becker
(74) *Attorney, Agent, or Firm* — Thomas | Horstemeyer, LLP (57) ABSTRACT

A method and an apparatus (1) serve for the automatic batch-wise production of a slurry containing a sugar component, i.e. sugar or a sugar substitute, for producing confectioneries. A liquid is fed into a weighing and mixing container (2) in a batch-wise and weight-accurate way. A sugar component as a dry material is fed into the container (2) in a batch-wise and weight-accurate way to produce a mixture. The liquid and the dry material are fed into container (2) and the mixture is mixed such that a slurry having a share of dry substance of at least 85% is produced. The liquid, the dry material, the mixture and/or the slurry is/are heated such that the slurry has a temperature of at least 70° C.

9 Claims, 6 Drawing Sheets

(56) References Cited

U.S. PATENT DOCUMENTS

| | | | |
|---|---|---|---|
| 5,460,209 A * | 10/1995 | Jandura et al. | 141/83 |
| 6,180,152 B1 * | 1/2001 | Yoon | 426/512 |
| 6,182,556 B1 * | 2/2001 | Nelson et al. | 99/331 |
| 6,406,726 B1 * | 6/2002 | Sextro | 426/232 |
| 6,685,981 B1 * | 2/2004 | Lipp | 426/660 |
| 6,956,598 B2 | 10/2005 | Fujiwara | |
| 7,387,429 B2 | 6/2008 | Markwardt | |
| 7,598,464 B2 * | 10/2009 | Deng | 177/144 |
| 2002/0004086 A1 * | 1/2002 | Zietlow et al. | 426/104 |
| 2003/0124243 A1 * | 7/2003 | Cotten et al. | 426/660 |
| 2006/0077753 A1 * | 4/2006 | Markwardt | 366/132 |
| 2011/0189358 A1 * | 8/2011 | Herbert | 426/231 |

FOREIGN PATENT DOCUMENTS

| | | |
|---|---|---|
| DE | 2141931 | 2/1973 |
| DE | 2511846 | 9/1976 |
| DE | 2933053 | 3/1981 |
| DE | 69907165 T2 | 10/2003 |
| DE | 102004049269 | 6/2006 |
| DE | 10217984 C5 | 9/2006 |
| EP | 0418106 | 3/1991 |
| GB | 2056297 | 3/1981 |
| WO | WO2009124799 | 10/2009 |

* cited by examiner

METHOD AND APPARATUS FOR THE ENERGY-SAVING PRODUCTION OF CONFECTIONERY MASSES

CROSS REFERENCE TO RELATED APPLICATIONS

This application claims priority to co-pending German Patent Application No. DE 10 2010 037 516.0 entitled "Verfahren and Vorrichtung zur energiesparenden Herstellung von Süβwarenmassen", filed Sep. 14, 2010.

FIELD OF THE INVENTION

The present invention generally relates to a method and an apparatus for producing a slurry for confectioneries in a batch-wise way. The slurry contains a sugar component which is to be understood herein as sugar or a sugar substitute such as a sweetener.

The confectioneries may be especially candies, soft caramels, hard caramels, toffees, fondant and the like. For producing such confectioneries, one produces an initial mass being a mixture of at least one liquid and at least one dry material which are then mixed such that one attains a suspension, the so called slurry. When producing hard caramels, the liquid is glucose syrup and the solid material is sugar. When producing sugar-free confectioneries, the liquid may be water and the solid material is a sugar substitute. When producing soft caramels, one typically uses further liquids such as milk, fat, sorbitol and the like.

BACKGROUND OF THE INVENTION

A method and an apparatus for the batch-wise production of a slurry for confectioneries containing sugar are known from German Patent Application No. DE 29 33 053 A1, corresponding to British Patent Application No. GB 2 056 297 A. The apparatus includes a weighing and mixing container into which at first crystal sugar as the solid material and then glucose syrup and water as the liquid are introduced. The mixture resulting therefrom is premixed by a mixer. The mixture is then discharged through a locking valve into a separate mixing container in which the mixture is further mixed by another mixer to produce a slurry. It is possible to use 100 parts by weight of sugar, 100 parts by weight of glucose syrup and 10 parts by weight of water. According to the knowledge of the present applicant, glucose syrup that can be processed has a share of water of approximately 20% such that the known slurry has a share of dry substance of approximately 85%.

A method of batch-wise producing a slurry for fondant masses containing sugar is known from German Patent Application No. DE 25 11 846 A1. According to the method, 100 kg of sugar, 20 kg of glucose syrup having a share of water of 20% by weight and 20 kg of water are mixed and dissolved while being heated. The slurry thus has a share of dry substance of approximately 83%.

A method and an apparatus of continuously producing a slurry for sweets containing sugar are known from PCT Application No. WO 2009/124799 A1. The method and the apparatus intentionally operate continuously, meaning they do not operate in batches. For producing the slurry, at least one liquid and at least one solid material are continuously fed into a mixing container. The share of dry substance of the slurry may be between 80 and 90%.

Further methods and apparatuses relating to the production of confectionery masses are known from German Patent No. DE 10 2004 049 269 B3, corresponding to U.S. Pat. No. 7,387,429 B2; German Patent No. DE 699 07 165 T2, corresponding to U.S. Pat. No. 6,182,556 B1; German Patent No. DE 102 17 984 C5; German Patent Application No. DE 21 41 931 A; German Patent No. DE 906 886 B; Austrian Patent No. AT 193 238 B; and U.S. Pat. No. 6,953,598 B2.

SUMMARY OF THE INVENTION

A automatic method serves for batch-wise producing a slurry containing a sugar component, the slurry serving for producing confectioneries. A liquid is fed into a weighing and mixing container in a batch-wise and weight-accurate way. A sugar component as a dry material is fed into the weighing and mixing container in a batch-wise and weight-accurate way to produce a mixture. The liquid and the dry material are fed into the weighing and mixing container and the mixture is mixed such that a slurry having a share of dry substance of at least 85% is produced. At least one element selected from the group consisting of the liquid, the dry material, the mixture and the slurry is heated such that the slurry has a temperature of at least 70° C. These method steps may also be conducted in a different order or partly or entirely simultaneously.

An apparatus for the automatic batch-wise production of a slurry containing a sugar component for producing confectioneries includes a weighing and mixing container and a heating unit. The weighing and mixing container includes a weight control unit being designed and arranged for batch-wise and weight-accurate feeding a liquid and of a sugar component as a dry material into the container for producing a mixture in the container. The liquid and the dry material are fed into the container and the mixture is mixed in the container such that a slurry having a share of dry substance of at least 85% is produced. The heating unit is arranged at the container and includes a temperature control unit. The heating unit is designed and arranged to heat the container such that the slurry has a temperature of at least 70° C.

The novel method and apparatus for batch-wise producing a slurry for confectioneries containing a sugar component allow for flexibly changing the recipe and at the same time reduce the energy demand for producing the confectionery mass.

The confectioneries may be especially candies, soft caramels, hard caramels, toffees, fondant and the like. The new initial mass or starting mass for the production of hard caramel especially includes approximately 50% by weight of sugar or a sugar substitute and approximately 50% by weight of glucose syrup. The glucose syrup has a share of water of approximately 20% by weight. The finished slurry thus has a share of dry substance of approximately 90%. The new starting mass for producing fondant especially includes approximately 100 kg of sugar, 20 kg of glucose syrup and approximately 9 kg of water. The glucose syrup has a share of water of approximately 20% by weight. The finished slurry thus has a share of dry substance of approximately 90%.

The slurry is a suspension of a liquid and solid materials contained therein, the solid materials not yet being fully dissolved. After having dissolved the solid materials in the slurry—usually by a pressure dissolving method—the former slurry is then designated as a solution. This solution is then cooked to reduce its share of water, and it may be further processed. The substance resulting therefrom then forms the confectionery mass and a part of the confectioneries to be produced, respectively.

The novel method and apparatus make use of the advantages of a batch-wise production of the slurry in contrast to a continuous production. For example, these advantages are especially that changes of the recipe and a change of the starting materials may be conducted in a very flexible way. Furthermore, a plurality of systems for further processing the slurry can be supplied with masses according to different recipes in a comparatively simple way by using only one central mixing system. This flexibility is now combined with the advantage of a reduced energy demand for the production of confectioneries. The reduction of the energy demand is achieved by preparing the mixture of at least one dry substance and at least one liquid such that the slurry resulting therefrom by mixing has a great share of dry substance of at least 85%—especially of 90% or more—and one later requires less energy for reducing the share of water by vaporizing.

Such a low share of liquid of 15% and 10%, respectively, or less results in the viscosity of the slurry being increased disproportionately. This has a negative influence on the capability of further processing and especially of mixing and pumping the slurry. When the viscosity of the slurry is too high, the slurry can no longer be pumped through the respective conduits for further processing as it is desired. According to the novel method, the liquid, the dry material, the mixture and/or the slurry are heated in a way such that the slurry has a temperature of at least 70° C. and especially between 80° C. and 100° C. In this way, one attains the desired low viscosity at the high share of dry substance of at least 85%. The ability of further processing and pumping the slurry is maintained, and the energy consumption during processing is reduced since less water has to be removed from the slurry by vaporizing. The saving of energy is substantial since the heat of vaporization of water at atmospheric pressure is approximately 539 kcal/kg which clearly predominates the comparatively slightly increased energy consumption during the production of the slurry by heating. Compared to the prior art, this results in a saving of energy of approximately 30 to 50%.

It is important that the slurry has a low viscosity despite the high share of dry substance. This is realized by respective heating. There are a number of different possibilities of heating the starting materials, the mixture and/or the finished slurry. The present application speaks of a mixture when the starting materials have at least been partly combined and mixed, but the finished slurry (which results from further mixing) has not yet been produced. When the starting materials—i.e. the at least one liquid and the at least one dry material—are heated, this may already be realized outside of the weighing and mixing container, and it may be continued inside of the weighing and mixing container as far as the starting material which is introduced at first is concerned. The mixture and/or the slurry are heated in the weighing and mixing container.

The novel heating unit including a temperature control unit thus heats the weighing and the mixing container in the sense of defined heating of the mass contained therein and not in the sense of comparatively weak and undefined heating of the housing for preventing adhering effects of the mass at the inner surface of the wall as it is known in the prior art.

The weighing and mixing container is preferably designed as exactly one container in which both functions of weighing and feeding, respectively, and of mixing for obtaining the slurry under the introduction of heat are conducted. However, it is also possible to distribute the functions of the weighing and mixing container to a plurality of separate containers. In this case, a first container may serve to weigh and to feed, respectively, while mixing and heating. However, mixing is not conducted in this container until one reaches the finished slurry. Mixing is instead completed under the introduction of heat for obtaining the finished slurry in a second container being located downstream, the mixture being fed from the first container into the second container.

The weighing and mixing container may be heated during feeding of the dry material such that mixture has a temperature which is approximately constant and which is at least 70° C. In this way, one ensures that the liquid contained in the weighing and mixing container has a sufficiently high temperature to hold the additionally introduced dry material. In the novel apparatus, this is realized by a sensor of the temperature control unit, the sensor sensing the temperature prevailing in the weighing and mixing container and resulting in the heating unit being respectively controlled.

The throughput of the dry material may be controlled in a way that the temperature of the mixture is approximately constant, and it is at least 70° C. In the novel apparatus, this is realized by the temperature control unit. Depending on the temperature of the mixture and of the dry material already contained in the weighing and mixing container, the amount of dry material which is introduced per time unit is controlled to finally reach the desired mixing proportion of the starting materials without exceeding the respective upper viscosity limit.

According to another aspect of the present invention—which can also be realized independent from the above described aspects—the energy consumption can be further decreased in a later process step. For further processing the slurry, the solid materials contained in the slurry are dissolved for producing a solution. Preferably, this is realized by pressure dissolution, i.e. the slurry is brought under the influence of positive pressure and the mass is heated below the evaporation temperature to dissolve the solid materials, and the mass is mixed. In the following, the solution is cooked to increase the share of dry substance while exhaust vapors are released. The exhaust vapors are condensed as a primary medium in a heat exchanger resulting in a secondary medium being heated. The condensed exhaust vapors and/or the heated secondary medium are then collected. The novel apparatus for this purpose includes a dissolving unit and especially a pressure dissolving unit for dissolving, a cooker for cooking, a heat exchanger for condensing the exhaust vapors and an apparatus and a container, respectively, for collecting the condensed exhaust vapors. It is also possible that the weighing and mixing container is also designed as a pressure dissolving unit and a pressure dissolving container, respectively, and thus dissolving of the solid materials contained in the slurry is also conducted in the weighing and mixing container.

In this way, the heat energy contained in the exhaust vapors may be used by the heat exchanger in an advantageous way such that the energy consumption of the entire system is further reduced. The exhaust vapors are not released into the atmosphere via a chimney as it is known in the prior art, but they are instead condensed in a heat exchanger. Preferably, cold water is used in the heat exchanger as secondary medium, the cold water absorbing heat energy from the exhaust vapors to be condensed as primary medium and the cold water thus being heated. This clean warm water can be stored in a reservoir of a CIP system (CIP=Cleaning In Place). The condensed exhaust vapors containing particles of the components forming the solution and thus being slightly polluted may also be used in the CIP system. Due to the slight pollution, they may be used for pre-cleaning, while the clean warm secondary medium may be used for rinsing purposes, for example.

Due to the cooking process which may also be realized by a plurality of steps in the sense of pre-cooking and separate finalizing cooking, the share of dry substance of the solution resulting from the processed slurry is further reduced. The desired share of dry substance depends on the product, and it may be in a range of up to approximately 99%.

The novel method and apparatus are suitable for producing slurries for confectioneries containing sugar as well as at least one sugar substitute. Preferably, the sugar substitute is a dry material, for example isomalt.

The processes of pressure dissolution and cooking may also be conducted in a common apparatus. In this case, the combined apparatus includes a dissolving part and a cooking part between which a controllable flow resistance exists to be capable of building up the desired system pressure in the dissolving part.

Due to the reduced share of water of the slurry, not only the required heat energy for evaporating the water later, but also the required heat exchange surface is reduced. The used cookers may thus be designed to be smaller and the throughput of already existing cooking units can be increased, respectively.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
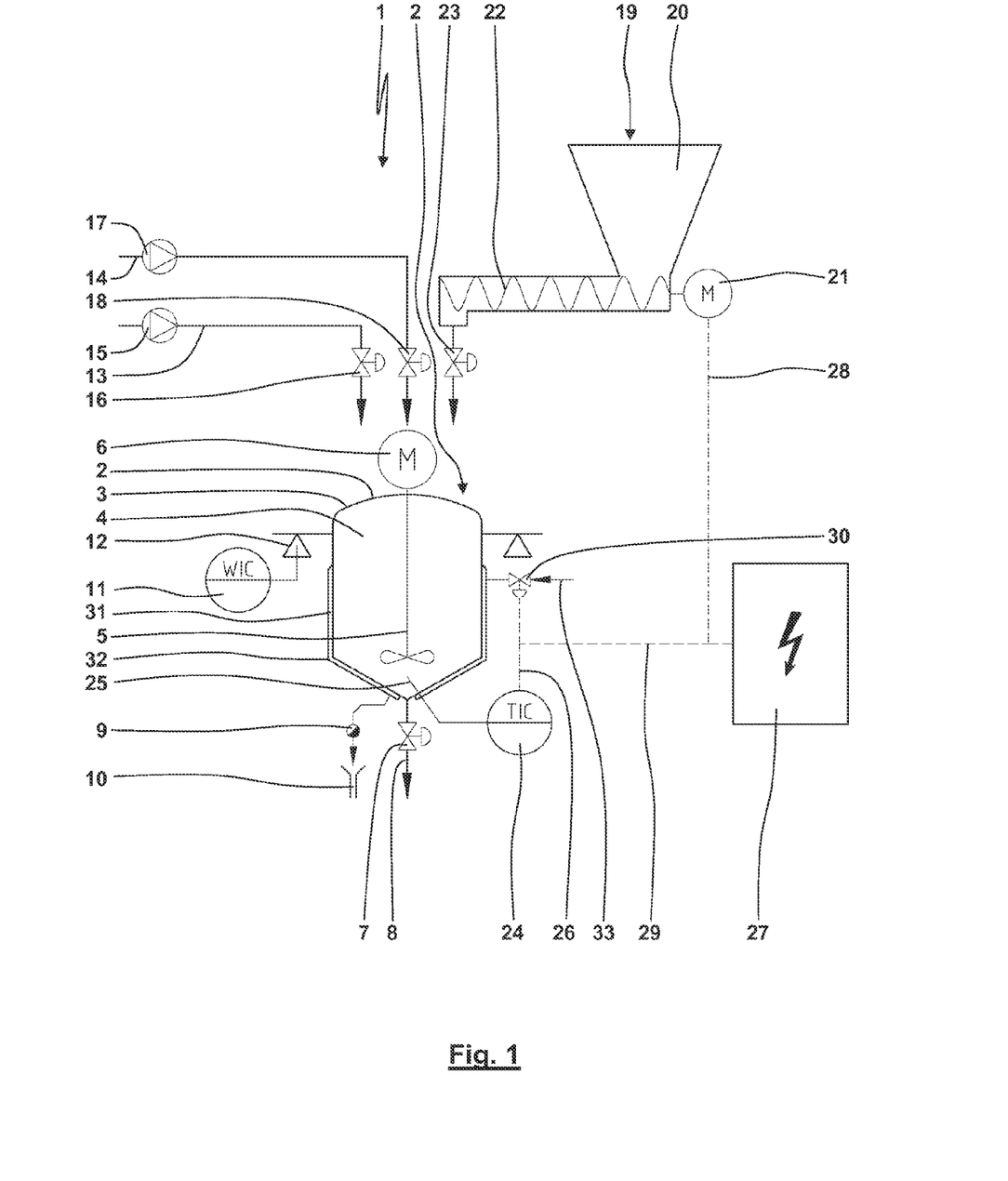
FIG. 1 is a view of a first exemplary embodiment of the novel apparatus for batch-wise producing a slurry.

Referring now in greater detail to the drawings, FIG. 1 illustrates a first exemplary embodiment of a novel apparatus 1 for batch-wise producing a slurry containing a sugar component (i.e. sugar or a sugar substitute) as starting mass for the production of a confectionery mass for producing confectioneries.

The apparatus 1 includes a weighing and mixing container 2 including a housing 3, an interior 4 and a mixer 5 being arranged in the interior 4. The mixer 5 is rotatingly driven by a motor 6. Instead of the mixer 5, it is also possible to use a different stirring unit or a beating unit. In the lower portion of the weighing and mixing container 2, the interior 4 is connected to a conduit 8 by a valve 7, the valve 7 in its closed position preventing a mass being contained in the interior 4 from exiting the weighing and mixing container 2 and allowing for discharging the mass in its opened position.

The weighing and mixing container 2 further includes a weight control unit 11 being designed as a WIC control unit (WIC=Weight Indication Control). The weight control unit 11 includes a suspension unit 12 including weighing cells and measuring feeders such that the weight of the weighing and mixing container 2 and of the mass contained therein, respectively, is determined.

A conduit 13 serves for introducing and feeding, respectively, a first liquid, and a conduit 14 serves for introducing and feeding, respectively, a second liquid into the container 2. A pump 15 and a valve 16 are located in the conduit 13. A pump 17 and a valve 18 are located in the conduit 14. For example, the first liquid may be water and it may especially have a temperature of between approximately 10° C. and 20° C. For example, the second liquid may be glucose syrup, and it may especially have a temperature of approximately between 50° C. and 60° C.

Furthermore, there is an apparatus 19 for introducing or feeding a dry material. Especially, the dry material may be sugar or one or a plurality of sugar substitutes. The apparatus 19 includes a reservoir container 20 which in its lower portion includes a conveying screw or auger 22 being driven by a motor 21. Furthermore, there is a valve 23 which can be locked by the apparatus 19 and which can be opened to discharge the solid material, respectively.

The weighing and mixing container 2 further includes a temperature control unit 24. The temperature control unit 24 may be especially designed as a TIC control unit (TIC=Temperature Indication Control). The temperature control unit 24 includes a sensor 25 serving to sense the temperature prevailing in the interior 4 of the weighing and mixing container 2. The temperature control unit 24 is connected to a control unit 27 by an electric line 26. The control unit 27 is further connected to the motor 21 by an electric line 28 and to the valve 30 by an electric line 29.

The valve 30 is associated with a heating unit 31 of the weighing and mixing container 2. The heating unit 31 includes a double wall 32 such that hot steam can enter into the double wall 32 of the heating unit 31 via a conduit 33 and the opened valve 30 such that the housing 3 is heated. Furthermore, a condensate drain 9 is arranged in this region, the condensate drain 9 serving to discharge the condensate into a drainage 10.

The operation of the apparatus 1 and the method may be described as follows:

The apparatus 1 serves for producing a slurry as a starting mass for the production of a confectionery mass for producing sweets. The production of the slurry is realized in batches, i.e. a specific amount of the slurry is produced and then discharged, and another specific amount of the same or of a different recipe is produced in the following. Such a batch-wise production is to be differentiated from a continuous production.

At first, the valve 16 is opened and the first liquid is pumped by a pump 15 through the conduit 13 into the interior 4 of the weighing and mixing container 2. Especially, this liquid is fresh water. Depending on the recipe, the desired mass is determined by the weight control unit 11 and the suspension 12 including weighing cells and measuring feeders such that the valve 16 is automatically closed as soon as the desired mass of the first liquid is contained in the weighing and mixing container 2.

In the following (or before this step), the second liquid is pumped in a similar way by the pump 17 through the conduit 14 and the opened valve 18 into the interior 4 of the weighing and mixing container 2. The mass of this liquid is also introduced in a weight-accurate way by the weight control unit 11.

Preferably, the mixer 5 is already operated when the second liquid is introduced such that one attains a mixture of the first and second liquid.

In the following (or before this step), the solid material is introduced into the interior of the weighing and mixing container 2 in a weight-accurate way via the opened valve 32. The solid material is introduced by the conveying screw 22 being rotatingly driven by the motor 21 and thus discharging the solid material from the reservoir container 20. Now that all components according to the recipe have been introduced into the weighing and mixing container 2, the mixing phase begins or is continued such that the starting materials are mixed to obtain a suspension. This suspension is called the slurry.

Hot water steam is introduced into the double wall 32 by the heating unit 31. In this way, the weighing and mixing container 2 and the starting materials contained therein, the mixture and the slurry, respectively, are heated. Heating results in the slurry obtaining a sufficiently low viscosity despite the great share of dry substance of the slurry of approximately 85%—especially of 90% or more—such that the slurry can still be mixed and pumped. The condensate resulting from heating is discharged by the condensate drain 9 into the drainage 10.

In addition to the weight control unit 11, the apparatus 1 includes a temperature control unit 24 being electrically connected to the valve 30 and to the control unit 27. The temperature control unit 24 senses the temperature of the mass contained in the interior 4 by the sensor 25, and it controls the heat emission of the heating unit 31 in response to the determined temperature by opening and closing, respectively, the valve 30. Furthermore, the motor 21 of the apparatus 19 is controlled by the control unit 27 such that the number of rotations of the conveying screw 22 and thus the throughput of the solid material is controlled in response to the temperature determined by the sensor 25. When the temperature falls below a specific threshold, the heat capacity of the heating unit 35 is increased and the conveying capacity of the conveying screw 22 is reduced such that the viscosity is no longer increased. In this way, the mass contained in the weighing and mixing container 2 can still be mixed and pumped. The apparatus 1 is operated in a way with respect to the temperature such that the temperature of the mixture is approximately constant, and it has a value of at least 70° C., and this temperature is also maintained during continued mixing for producing the slurry. This is achieved by controlling the heating unit 31 as well as by controlling the throughput of the dry material.

After mixing of the slurry has been completed, the valve 7 is opened and the slurry is discharged through the conduit 8 from the interior 4 of the weighing and mixing container 2 for further processing.

Figure 2:
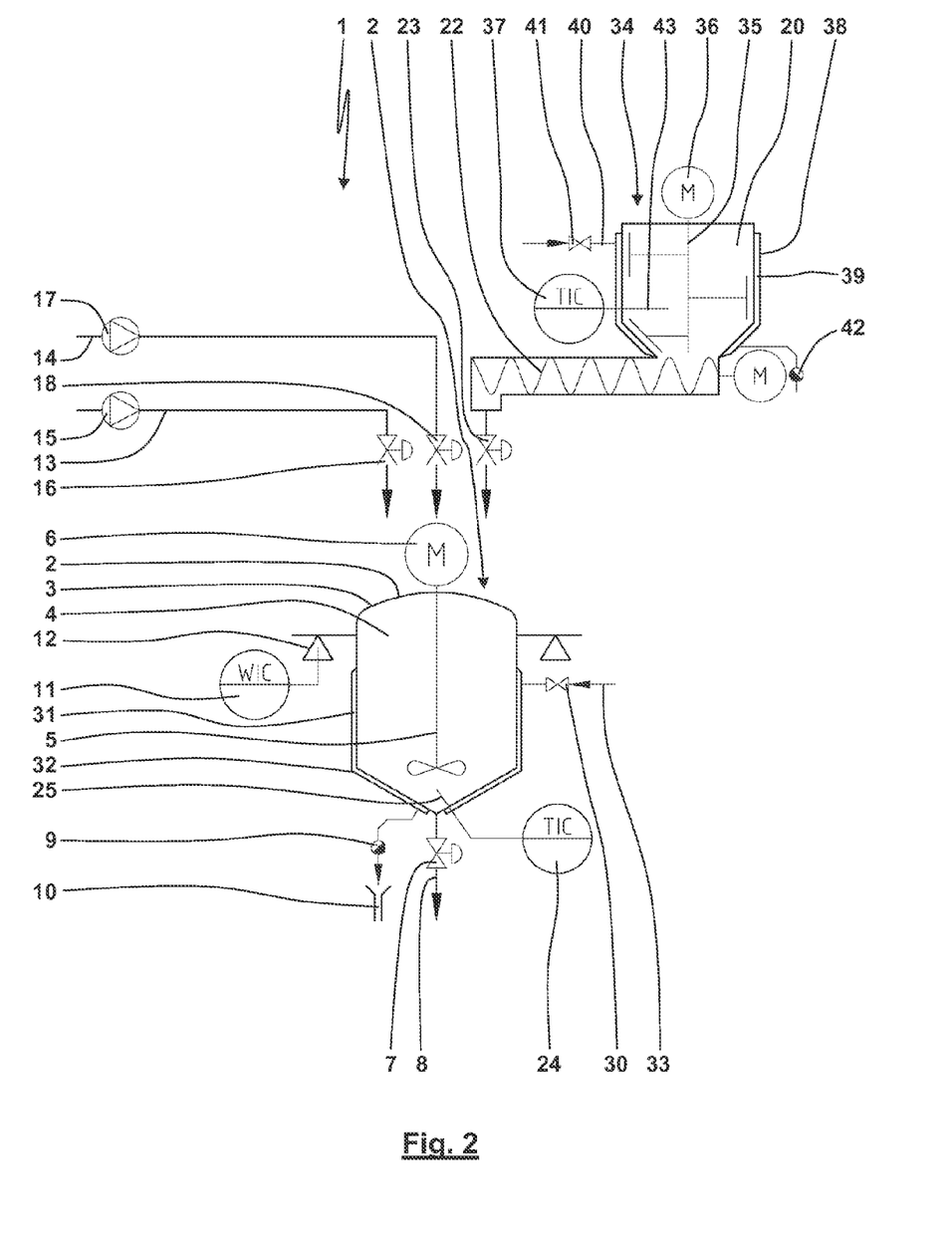
FIG. 2 is a view of a second exemplary embodiment of the novel apparatus for batch-wise producing a slurry.

FIG. 2 illustrates a second exemplary embodiment of the novel apparatus 1. With respect to the corresponding features and their function, it is referred to the above description to prevent unnecessary repetitions.

Instead of the apparatus 19 for feeding the solid material, this embodiment of the apparatus 1 includes an apparatus 34. The apparatus 34 includes a reservoir container 20 including a stirring unit 35 being located therein. The stirring unit 35 is connected to a motor 36, and it is rotatingly driven thereby. The apparatus 34 further includes a temperature control unit 37 and a heating unit 38. The heating unit 38 includes a double wall 39, a conduit 40 and a valve 41. Furthermore, a condensate drain 42 is connected to the heating unit 38.

The apparatus 34 is thus designed to heat the dry material being introduced into the weighing and mixing container 2 via the apparatus 34. For this purpose, water steam is introduced into the double wall 39 of the heating unit 38 via the valve 41 and the conduit 40, and the steam thus heats the apparatus 34 and the solid material contained therein. To realize uniform heat transmission and temperature distribution, the stirring unit 35 is rotatingly driven by the motor 36. The temperature control unit 37 includes a sensor 43 protruding into the interior of the apparatus 34 to detect the temperature prevailing therein. The detected temperature value is introduced into the temperature control unit 37, and it serves to control the heating capacity of the heating unit 38 in a way that it is ensured that the solid material contained in the apparatus 34 has the desired temperature and maintains this temperature.

Preferably, the valve 23 is opened and the conveying screw 22 is rotatingly driven by the motor 21 to introduce the solid material into the weighing and mixing container 2 after the solid material contained in the apparatus 34 has the desired temperature. Since the temperature and the throughput of the solid material have been chosen in the first place such that the resulting mixture contained in the weighing and mixing container 2 maintains the desired temperature the control of the motor 21 in response to the temperature control unit 24 of the weighing and mixing container 2 as illustrated in FIG. 1 is not required, but it could nevertheless be arranged in addition.

Figure 3:
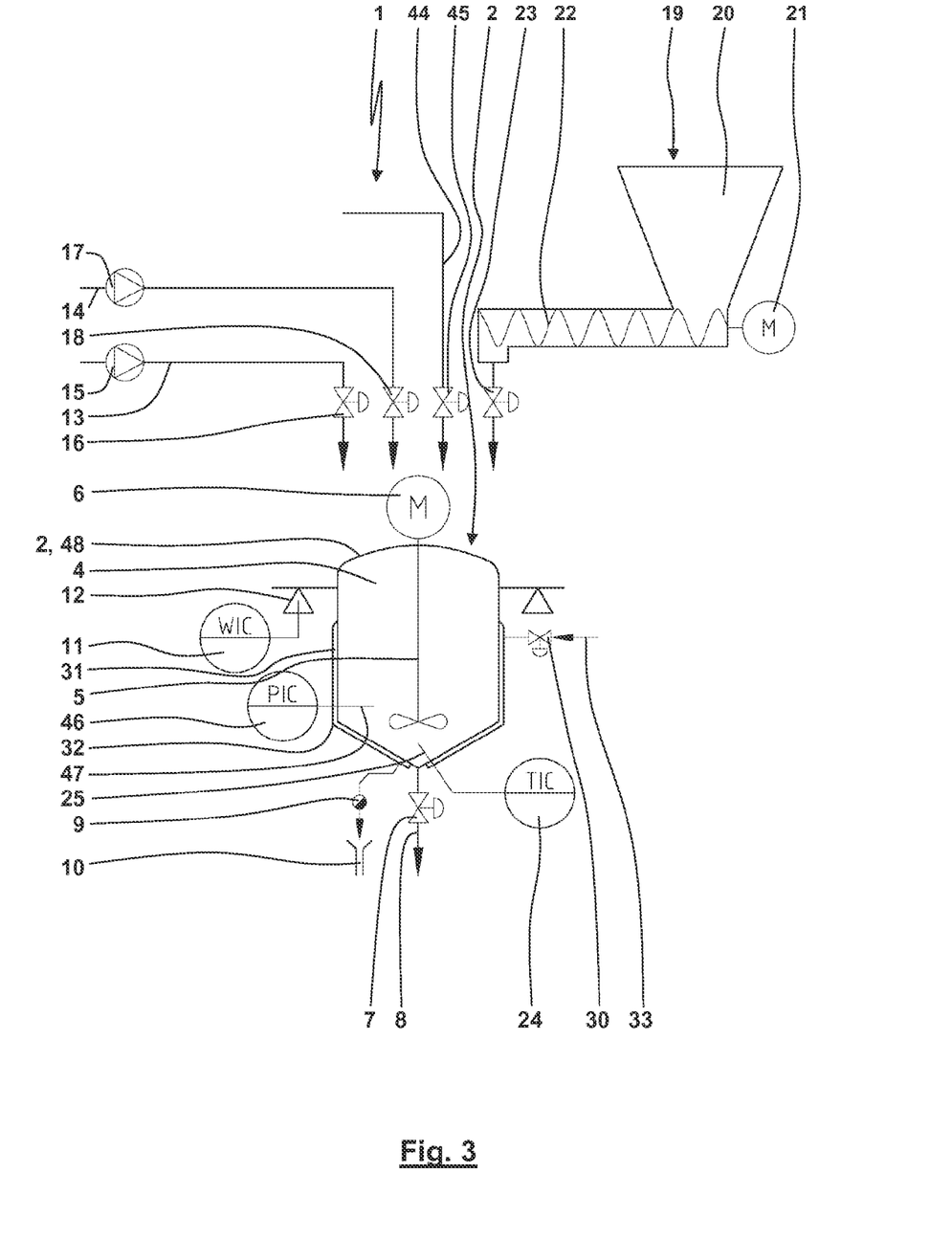
FIG. 3 is a view of a third exemplary embodiment of the novel apparatus for batch-wise producing a slurry and for further processing the slurry.

FIG. 3 illustrates a third exemplary embodiment of the novel apparatus 1 for the batch-wise production of a slurry and for further processing the slurry. With respect to the corresponding features and their function, it is referred to the above description to prevent unnecessary repetitions.

In the present case, in addition to the conduits 13 and 14 for introducing a first and a second liquid, there is a conduit 44 serving to introduce a third liquid. The third liquid may be another component according to the recipe, as, for example, invert sugar, sorbitol and the like, which is introduced into the interior 4 of the weighing and mixing container 2 in a weight-accurate way.

In addition to the weight control unit 11 and the temperature control unit 24, the apparatus 1 and the weighing and mixing container 2, respectively, in this case includes a pressure control unit 46. The pressure control 46 includes a sensor 47 serving to sense the pressure prevailing in the interior 4 of the weighing and mixing container 2. The weighing and mixing container 2 in this case is simultaneously designed as a dissolving container 48. This means that not only the slurry is produced in the container 2, 48, but the solid materials contained in the slurry are dissolved to produce the solution by applying a positive pressure and respective further mixing and heating. This process of dissolving the solid materials in the slurry under the influence of positive pressure is also designated as pressure dissolving.

Figure 4:
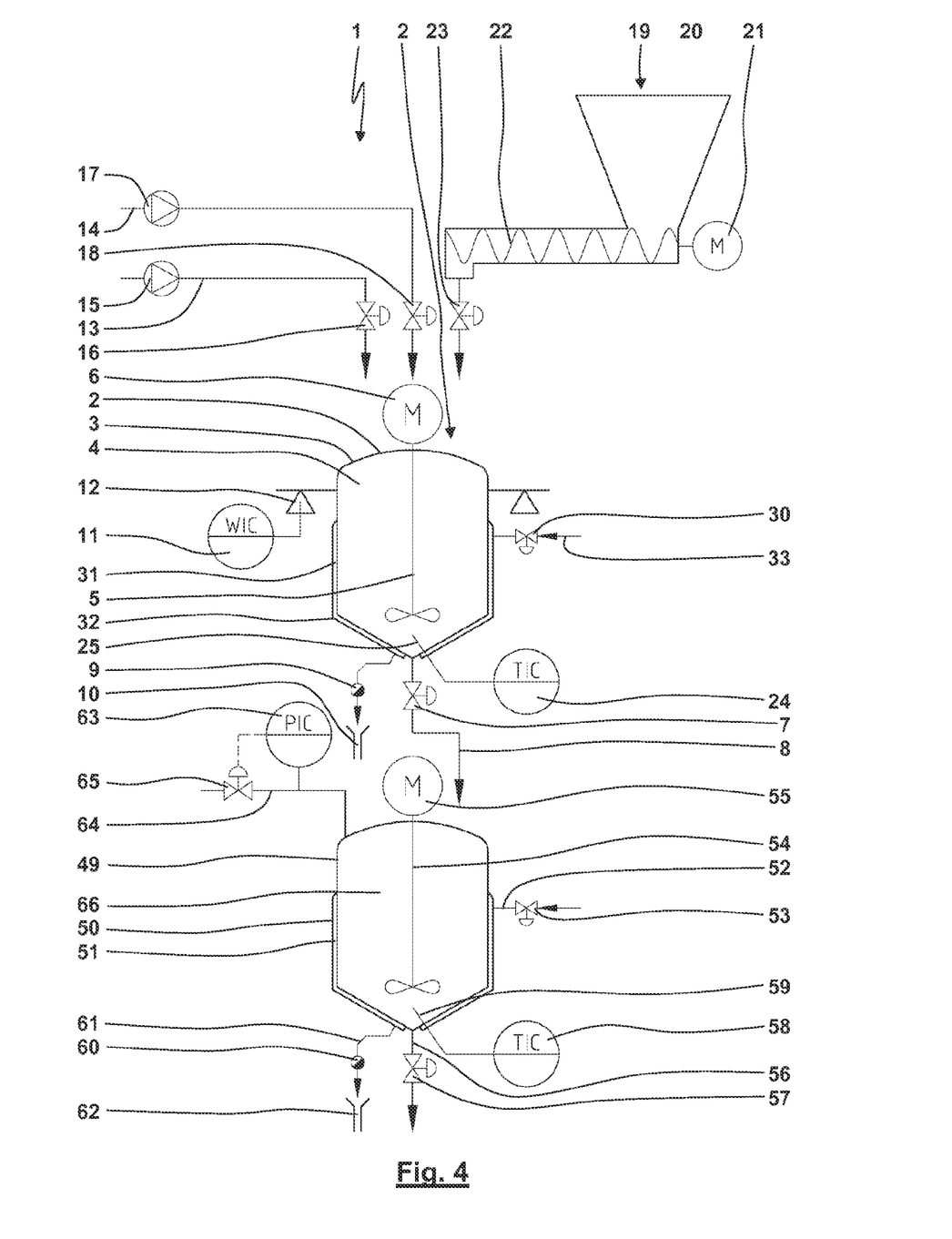
FIG. 4 is a view of a fourth exemplary embodiment of the novel apparatus for batch-wise producing a slurry and for further processing the slurry.

FIG. 4 illustrates a fourth exemplary embodiment of the novel apparatus 1 for the batch-wise production of a slurry and for further processing the slurry. With respect to the corresponding features and their function, it is referred to the above description to prevent unnecessary repetitions.

In contrast to the embodiment according to FIG. 3, the apparatus 1 includes a separate dissolving container 49. The dissolving container 49 includes a heating unit 15 having a double wall 51, a conduit 52 and a valve 53. This heating unit 50 is also operated with steam. Furthermore, the dissolving container 49 includes a mixer 54 being connecting to a motor 55 and being rotatingly driven by the motor 55. The dissolving container 49 in its lower portion further includes a conduit 56 and a valve 57 serving to discharge the mass contained in the container 49. Furthermore, there is a temperature control unit 58 including a sensor 59. The heating unit 50 further includes a condensate drain 60 by which the condensate is discharged into a drainage 62 via a conduit 61. Furthermore, the dissolving container 49 includes a pressure control unit 63. The pressure control unit 63 is connected to the interior 66 of the dissolving container 59 by a conduit 64 and a valve 65, and it is capable of sensing and determining the pressure prevailing in the container 49.

After the production of the slurry in the weighing and mixing container 2 has been completed and the slurry has been discharged into the interior 66 of the dissolving container 49 via the open valve 7 and the conduit 8, pressure dissolving serving to produce a solution from the slurry takes place in the dissolving container 49. Pressure dissolving takes place while the slurry and the solution resulting therefrom, respectively, is heated by the heating unit 50 being controlled by the temperature control unit 58. While the mixture is mixed by the mixer 54, the positive pressure prevailing in the interior 66 of the dissolving unit 49 is controlled by the pressure control unit 63 such that the desired pressure dissolving—i.e. dissolving of the solid materials contained in the slurry—has been achieved in the sense of reaching the solution.

Figure 5:
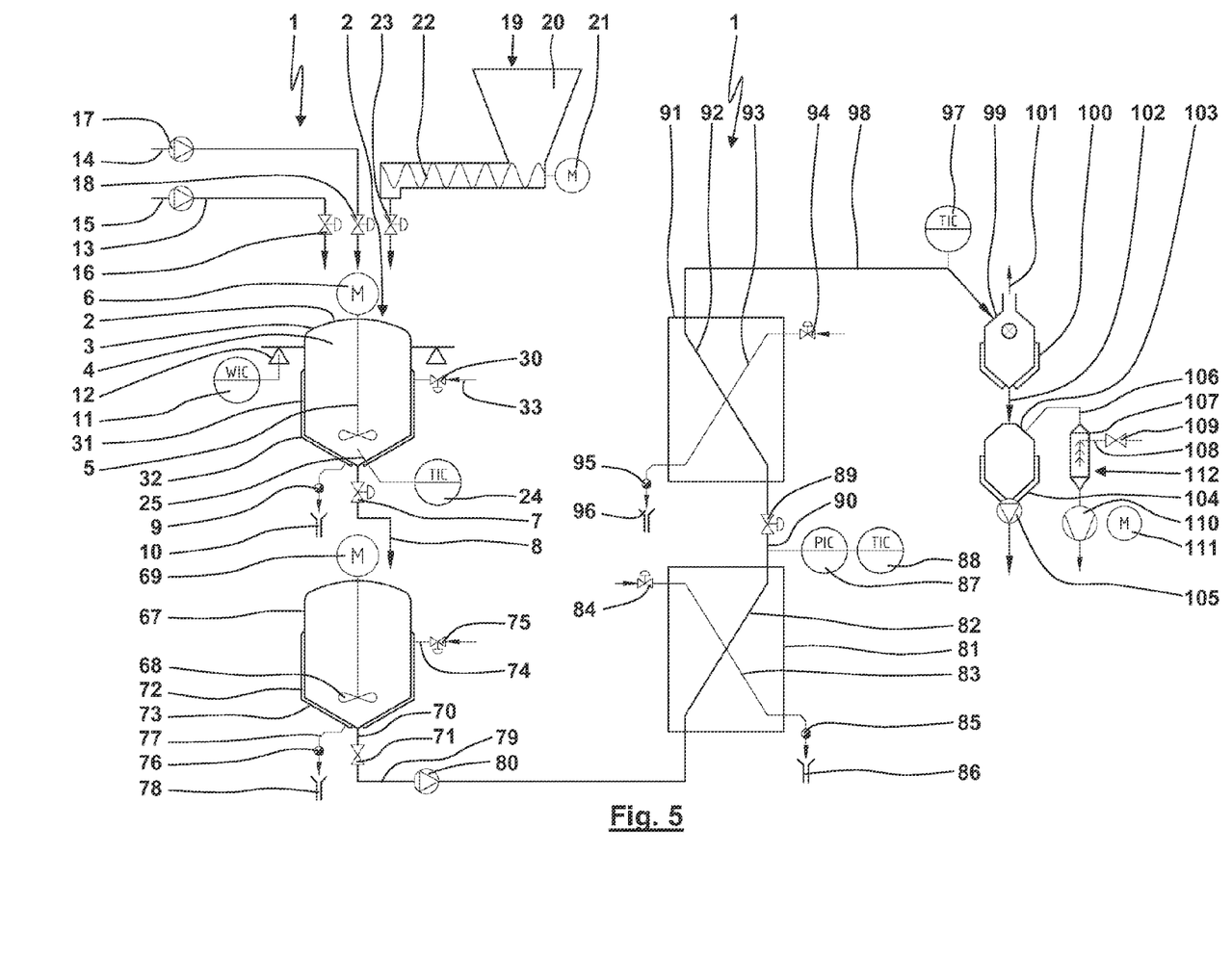
FIG. 5 is a view of a fifth exemplary embodiment of the novel apparatus for batch-wise producing a slurry and for further processing the slurry.

FIG. 5 illustrates a fifth exemplary embodiment of the novel apparatus 1 for batch-wise producing a slurry and for further processing the slurry. With respect to the corresponding features and their function, it is referred to the above description to prevent unnecessary repetitions.

In this case, a reservoir container 67 is located downstream of the weighing and mixing container 2. The reservoir container 67 includes a mixer 68 and a motor 69 connected therewith for rotatingly driving the mixer 68. A conduit 70 with a valve 71 is located at the lower end of the reservoir container 67. The reservoir container 67 further includes a heating unit 72 including a double wall 73, a conduit 74 and a valve 75. Furthermore, a condensate drain 76 is connected to the heating unit 72 via a conduit 77 such that condensed water steam of the heating unit 72 can be discharged into a drainage 78. Close to the conduit 70 and the valve 71, a conduit 79 is connected to a pump 80.

The exit of the reservoir container 67 is connected with a dissolving container 81 by the conduit 79 and the pump 80. The dissolving container 81 is designed as a heat exchanger, and it includes a conduit 82 through which the slurry as a primary medium is transported through the heat exchanger. Furthermore, there is a conduit 83 including a valve 84 by which a warm secondary medium—especially steam—is conveyed through the heat exchanger to transfer heat to the primary medium. At the end of the conduit 83, there is a condensate drain 85 by which the condensate resulting therefrom is discharged into a drainage 86. The dissolving container 81 further includes a pressure control unit 87 and a temperature control unit 88. The dissolving container 81 is connected to the entrance of the cooking apparatus 91 by a conduit 90 and a valve 89 being designed as a pressure maintaining valve. The cooking apparatus 91 includes a conduit 92 and a flow path, respectively, via which the solution serving as the primary medium is conveyed through the cooking apparatus 91 being designed as a heat exchanger. The cooking apparatus 91 further includes a conduit 93 with a valve 94 via which a secondary medium delivering heat—especially steam—is guided through the cooking apparatus 91. The condensate resulting therefrom is discharged by a condensate drain 95 into a drainage 96.

The mass is fed into an evaporating container 99 via a conduit 98. The evaporating container 99 includes a heating unit 100 and a temperature control unit 97. The heating unit 100 is operated with water in the illustrated example. The exhaust vapors 101 being produced in the evaporating container 99 are discharged from the evaporating container 99 into the atmosphere.

An evaporating container 99 is connected to a vacuum container 103 by a conduit 102. The vacuum container 103 includes a heating unit 104 again being preferably operated with warm water. Furthermore, there is a pump 105 by which the resulting mass is pumped out off the vacuum container 103. The vacuum container 103 is connected to a water container 107 by a conduit 106. Water is fed into the water container 107 via a conduit 108 and a valve 109. The water container 107 is connected to a compressor 110 being driven by a motor 111. The aforementioned components commonly form a vacuum pump 112.

In addition to the above described method, the following of this exemplary embodiment is characteristic:

The reservoir container 67 and the conduit 79, respectively, and the pump 80 define the transition region between the batch-wise operated method upstream and the continuously operated method downstream. The reservoir container 67 forms a buffer, and it serves to store a certain amount of the slurry which has been produced in batches, the slurry then being continuously further processed. After the slurry has been further tempered and mixed in the reservoir container 67, it is continuously conveyed into the dissolving container 81. The dissolving container 81 is designed as a heat exchanger, and it controls the pressure by the pressure control unit 87 and the temperature by the temperature control unit 88. Thus, the slurry is treated in the dissolving container 81 under positive pressure and under the introduction of heat such that the solid materials contained in the slurry are dissolved to obtain a solution.

After this so called pressure dissolving step, the solution being obtained from the slurry is introduced into the cooking apparatus 91 via the conduit 90 and the opened valve 89. In the cooking apparatus 91 being designed as a heat exchanger, the solution is conveyed through the conduit 92 and a flow path, respectively, as a primary medium, and it is cooked by the secondary medium which is water steam being conveyed through the conduit 93. In this way, the proportion of liquid and water, respectively, in the solution is further reduced.

After cooking has been completed, the solution having the increased share of dry substance—especially a share of dry substance of approximately between 92% and 99% depending on the product—is fed into the evaporating container 99. The temperature of the solution is maintained by the heating unit 100, and the evaporating exhaust vapors 101 are released into the atmosphere.

The solution having a share of water which has been further decreased is then transported from the evaporating container 99 through the conduit 106 into the vacuum container 103. In the vacuum container 103, a vacuum is produced by the vacuum pump 112 and additional liquid components are discharged from the solution. The water being produced thereby is removed, while the produced complete solution can be used for further processing for producing the desired confectioneries.

Figure 6:
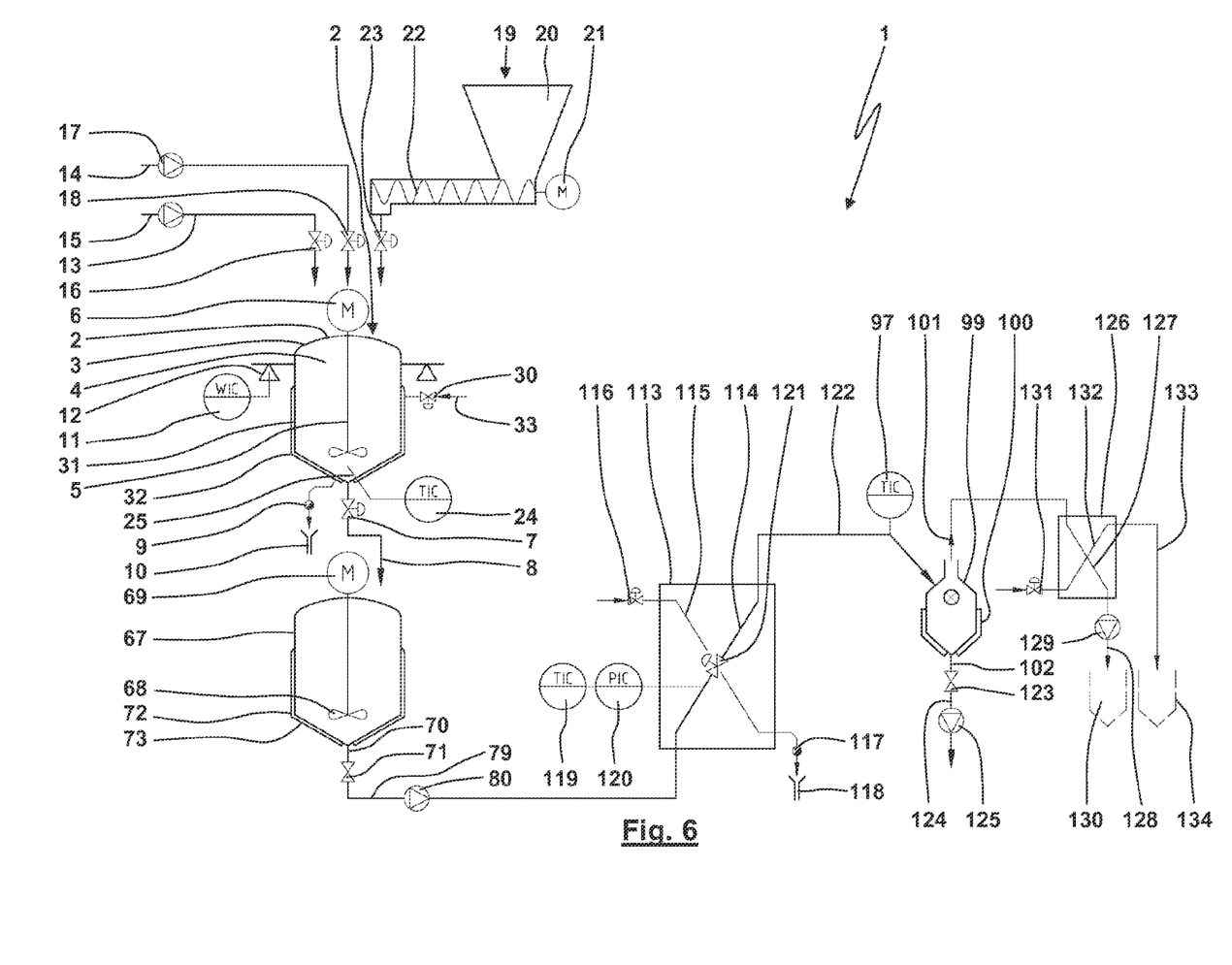
FIG. 6 is a view of a sixth exemplary embodiment of the novel apparatus for batch-wise producing a slurry and for further processing the slurry.

FIG. 6 illustrates a sixth exemplary embodiment of the novel apparatus 1 for batch-wise producing a slurry and for further processing the slurry. With respect to the corresponding features and their function, it is referred to the above description to prevent unnecessary repetitions.

In the present exemplary embodiment, a combined dissolving and cooking container 113 is located next to the conduit 79. The dissolving and cooking container 113 being designed as a heat exchanger includes a conduit 114 through which the slurry as the primary medium of the heat exchanger is guided.

Furthermore, there is a conduit 115 with a valve 116 via which water steam as the secondary medium to transfer heat is transported through the dissolving and cooking container 113. The condensate resulting therefrom is discharged via the condensate drain 117 into a drainage 118. The dissolving and cooking container 113 further includes a temperature control unit 119 and a pressure control unit 120. An adjustable valve 121 is arranged in the conduit 114. The valve 121 separates the dissolving part of the container 113 being located upstream and the cooking part of the container 113 being located downstream.

The dissolving and cooking container 113 is connected to the evaporating container 99 by a conduit 122. The evaporating container 99 in this case includes a valve 123 being located next to the conduit 102 and a pump 125 being located in the conduit 124 to discharge the solution.

In this case, the exhaust vapors 101 being produced in the evaporating container 99 are fed into a heat exchanger 126. The heat exchanger 126 includes a conduit 127 through which the exhaust vapors 101 as primary medium are transported through the heat exchanger 126. The condensing exhaust vapors 128 resulting therefrom are fed into the container 130 by a pump 129. Preferably, cold water is used as secondary medium, the cold water being transported through the heat exchanger 126 by a valve 131 and the conduit 132. The cold water as secondary medium absorbs a part of the heat energy of the primary medium, it exits the heat exchanger 126 as heated secondary medium 133, and it is collected in a container 134.

In the present example, pressure dissolving and cooking take place in a combined dissolving and cooking container 113. The dissolving and cooking container 113 controls the temperature by the temperature control unit 119 and the pressure prevailing in the dissolving part by the pressure control unit 120. The pressure dissolving part is separated from the cooking part by the adjustable valve 121 such that the positive pressure being required in the dissolving part is maintained.

The resulting solution is then fed into the evaporating container 99 via the conduit 122. The heating unit 100 of the evaporating container 99 is controlled by the temperature control unit 97. In the lower part, the finished solution is now pumped out off the evaporating container 99 for further processing and for direct use as a confectionery, respectively.

The exhaust vapors 101 resulting from evaporation are advantageously used in this case to further reduce the energy consumption of the entire system. In contrast to the prior art, the exhaust vapors 101 are not released into the atmosphere through a chimney, but they are transported through a heat exchanger 126 to withdraw heat energy and to use this heat energy to provide warm water. The secondary medium 133 being heated in the heat exchanger 126 is used as clean warm water for cleaning or rinsing in a CIP system (CIP=Cleaning In Place), for example. The slightly impure condensed exhaust vapors are used in a pre-cleaning reservoir of the CIP system, for example, and are thus also used in a reasonable way.

For reasons of clarity of the illustrations of the drawings, the electric lines of the weight control units, temperature control units and pressure control units are not illustrated in great detail. The exact design is known to a person with skill in the art and thus does not need to be explained in greater detail.

Many variations and modifications may be made to the preferred embodiments of the invention without departing substantially from the spirit and principles of the invention. All such modifications and variations are intended to be included herein within the scope of the present invention, as defined by the following claims.

The invention claimed is:

1. An automatic method of batch-wise producing a slurry containing a sugar component for producing confectioneries, comprising the steps of:
   separately feeding a liquid into a weighing and mixing container in a batch-wise and weight-accurate way such that the weight of the liquid is determined by the weighing and mixing container;
   separately feeding a sugar component as a dry material into the weighing and mixing container in a batch-wise and weight-accurate way such that the weight of the dry material is determined by the weighing and mixing container to produce a mixture, the liquid and the dry material being fed into the weighing and mixing container and the mixture being mixed such that a specific amount of a slurry having a share of dry substance of at least 85% is produced;
   heating at least one element selected from the group consisting of the liquid, the dry material, the mixture and the slurry such that the slurry has a temperature of at least 70° C.; and
   discharging the specific amount of the slurry from the weighing and mixing container while no liquid and dry material are fed into the weighing and mixing container.

2. The method of claim 1, wherein the weighing and mixing container is heated during the step of feeding the dry material such that the mixture has an approximately constant temperature of at least 70° C.

3. The method of claim 1, wherein the dry material is fed into the weighing and mixing container with a throughput to produce the mixture and the throughput of the dry material is controlled such that the mixture has an approximately constant temperature of at least 70° C.

4. The method of claim 2, wherein the dry material is fed into the weighing and mixing container with a throughput to produce the mixture and the throughput of the dry material is controlled such that the mixture has an approximately constant temperature of at least 70° C.

5. The method of claim 1, wherein the dry material is heated before the step of feeding it the dry material into the weighing and mixing container.

6. The method of claim 1, further comprising the steps of:
   dissolving solid materials contained in the slurry to produce a solution;
   cooking the solution to increase the share of dry substance while releasing exhaust vapors;
   condensing the exhaust vapors as a primary medium in a heat exchanger while a secondary medium is heated; and
   collecting at least one element selected from the group consisting of the condensed exhaust vapors and the heated secondary medium.

7. The method of claim 1, wherein at least two liquids are fed into the weighing and mixing container.

8. The method of claim 7, wherein the liquids are water and glucose syrup.

9. The method of claim 1, wherein the slurry has a share of dry substance of at least 90%.

* * * * *